United States Patent
Shu et al.

(10) Patent No.: US 10,542,577 B2
(45) Date of Patent: Jan. 21, 2020

(54) CONNECTIVITY CHECKS IN VIRTUALIZED COMPUTING ENVIRONMENTS

(71) Applicant: Nicira, Inc., Palo Alto, CA (US)

(72) Inventors: Ming Shu, Beijing (CN); Jianjun Shen, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/678,135

(22) Filed: Aug. 16, 2017

(65) Prior Publication Data
US 2019/0059117 A1  Feb. 21, 2019

(51) Int. Cl.
| H04L 1/00 | (2006.01) |
| H04W 76/25 | (2018.01) |
| H04W 76/50 | (2018.01) |
| H04W 76/19 | (2018.01) |
| H04L 12/26 | (2006.01) |
| G06F 9/455 | (2018.01) |

(52) U.S. Cl.
CPC ......... H04W 76/25 (2018.02); H04L 43/0811 (2013.01); H04L 43/10 (2013.01); H04W 76/19 (2018.02); H04W 76/50 (2018.02); *G06F 2009/45595* (2013.01)

(58) Field of Classification Search
CPC ..... H04W 76/25; H04W 76/19; H04W 76/50; G06F 2009/45595
See application file for complete search history.

(56) References Cited

U.S. PATENT DOCUMENTS

| 8,843,624 | B2 * | 9/2014 | Britsch | G06F 9/4401 709/201 |
| 2010/0325473 | A1 * | 12/2010 | Agneeswaran | G06F 11/2041 714/4.1 |
| 2012/0246637 | A1 * | 9/2012 | Kreeger | H04L 67/1038 718/1 |
| 2013/0332602 | A1 * | 12/2013 | Nakil | G06N 99/005 709/224 |
| 2014/0047139 | A1 * | 2/2014 | Okita | G06F 3/00 710/38 |
| 2015/0103679 | A1 * | 4/2015 | Tessmer | H04L 43/0811 370/252 |
| 2015/0237132 | A1 * | 8/2015 | Antony | H04L 67/1095 709/224 |

* cited by examiner

*Primary Examiner* — Clemence S Han
(74) *Attorney, Agent, or Firm* — Su IP Consulting

(57) ABSTRACT

Example methods are provided for performing a connectivity check for multi-node application(s) in a virtualized computing environment. The method may comprise identifying a group of multiple virtualized computing instances that implements multi-node application(s), the group including a first virtualized computing instance supported by the first host that requires connectivity with a second virtualized computing instance supported by the second host. The method may also comprise configuring the first host to generate and send a connectivity check packet to the second host; and based on report information from one or more entities along a path traversed by the connectivity check packet, determining a connectivity status associated with the first virtualized computing instance and the second virtualized computing instance.

21 Claims, 7 Drawing Sheets

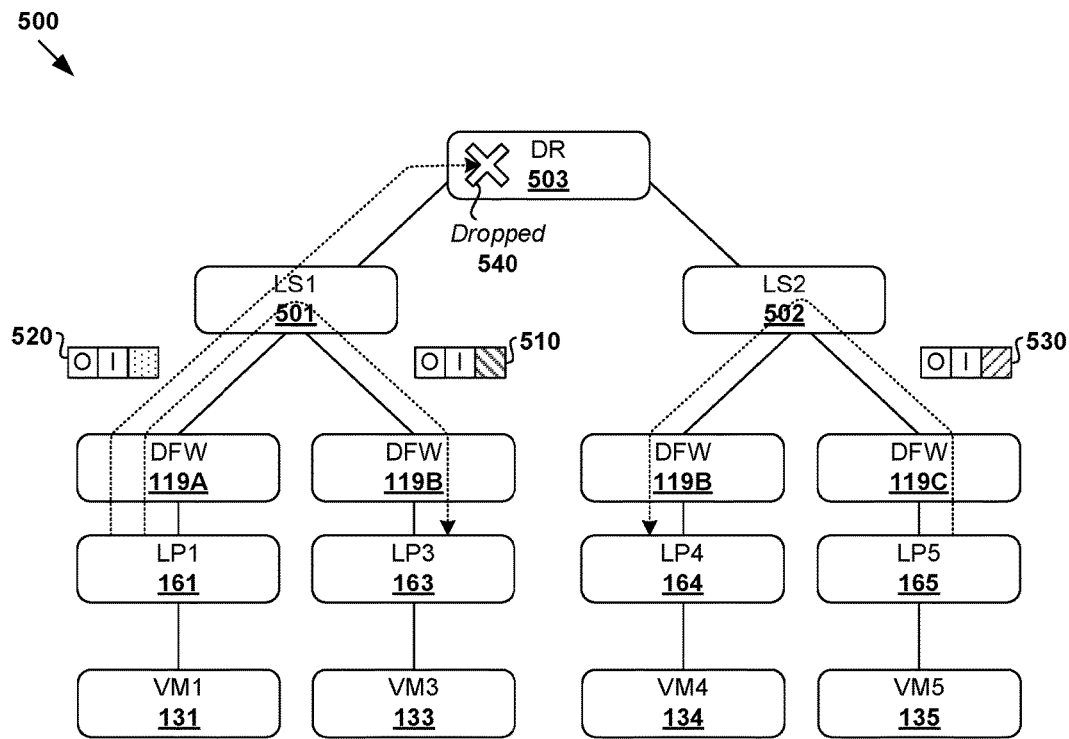

|  : First connectivity check packet 510 | | | |
|---|---|---|---|
| 516 Outer header (O)<br>Src VTEP: IP-A, MAC-A<br>Dest VTEP: IP-B, MAC-B<br>Logical overlay network: 5001 | 518<br>Check<br>Flag = 1 | 514 Inner header (I)<br>Src: IP-1, MAC-1<br>Dest: IP-3, MAC-3 | 512<br>Payload<br>(Session ID1) |

|  : Second connectivity check packet 520 | | | |
|---|---|---|---|
| 526 Outer header (O)<br>Src VTEP: IP-A, MAC-A<br>Dest VTEP: IP-C, MAC-C<br>Logical overlay network: 5001 | 528<br>Check<br>Flag = 1 | 524 Inner header (I)<br>Src: IP-1, MAC-1<br>Dest: IP-5, MAC-5 | 522<br>Payload<br>(Session ID2) |

|  : Third connectivity check packet 530 | | | |
|---|---|---|---|
| 536 Outer header (O)<br>Src VTEP: IP-C, MAC-C<br>Dest VTEP: IP-B, MAC-B<br>Logical overlay network: 5001 | 538<br>Check<br>Flag = 1 | 534 Inner header (I)<br>Src: IP-5, MAC-5<br>Dest: IP-4, MAC-4 | 532<br>Payload<br>(Session ID3) |

Fig. 5

First report information (session ID1: LP1 to LP3) 610

| Transport node | Reporting entity | Observation type |  |
|---|---|---|---|
| Host-A | LP1 | Injected | ~611 |
| Host-A | DFW | Received | ~612 |
| Host-A | DFW | Forwarded(RuleID:1) | ~613 |
| Host-A | LS1 | Forwarded | ~614 |
| Host-B | LS1 | Forwarded | ~615 |
| Host-B | DFW | Received | ~616 |
| Host-B | DFW | Forwarded(RuleID:2) | ~617 |
| Host-B | LP3 | Delivered | ~618 |

Second report information (session ID2: LP1 to LP5) 620

| Transport node | Reporting entity | Observation type |  |
|---|---|---|---|
| Host-A | LP1 | Injected | ~621 |
| Host-A | DFW | Received | ~622 |
| Host-A | DFW | Forwarded(RuleID:4) | ~623 |
| Host-A | LS1 | Forwarded | ~624 |
| Host-A | DR | Dropped | ~625 |

Third report information (session ID3: LP5 to LP4) 630

| Transport node | Reporting entity | Observation type |  |
|---|---|---|---|
| Host-C | LP5 | Injected | ~631 |
| Host-C | DFW | Received | ~632 |
| Host-C | DFW | Forwarded(RuleID:5) | ~633 |
| Host-C | LS2 | Forwarded | ~634 |
| Host-B | LS2 | Injected | ~635 |
| Host-B | DFW | Received | ~636 |
| Host-B | DFW | Forwarded(RuleID:6) | ~637 |
| Host-B | LP4 | Delivered | ~638 |

Aggregated report information 640

| Source VM | Destination VM | Connectivity Status |  |
|---|---|---|---|
| IP1(app1-s1) | IP3(app1-s2) | Session ID1: Connected | ~641 |
| IP1(app1-s1) | IP5(app1-s3) | Session ID2: Disconnected | ~642 |
| IP5(app1-s3) | IP4(app1-s4) | Session ID3: Connected | ~643 |

Fig. 6

CONNECTIVITY CHECKS IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, virtual machines may be deployed in a virtualized computing environment to operate as network nodes of multi-node application(s). A multi-node application may range from a simple website with a handful of network nodes to a more complex structure with hundreds or thousands of network nodes. To implement the multi-node application(s), connectivity may be required among the network nodes to send and receive packets. However, the connectivity between a pair of network nodes may be lost, or degrades over time, thereby adversely affecting the performance of the multi-node application(s).

BRIEF DESCRIPTION OF DRAWINGS

FIG. 5 is a schematic diagram illustrating example connectivity check packet configurations in a virtualized computing environment;

FIG. 6 is a schematic diagram illustrating example report information associated with the connectivity check packets in the example in FIG. 5.

DETAILED DESCRIPTION

Figure 1:
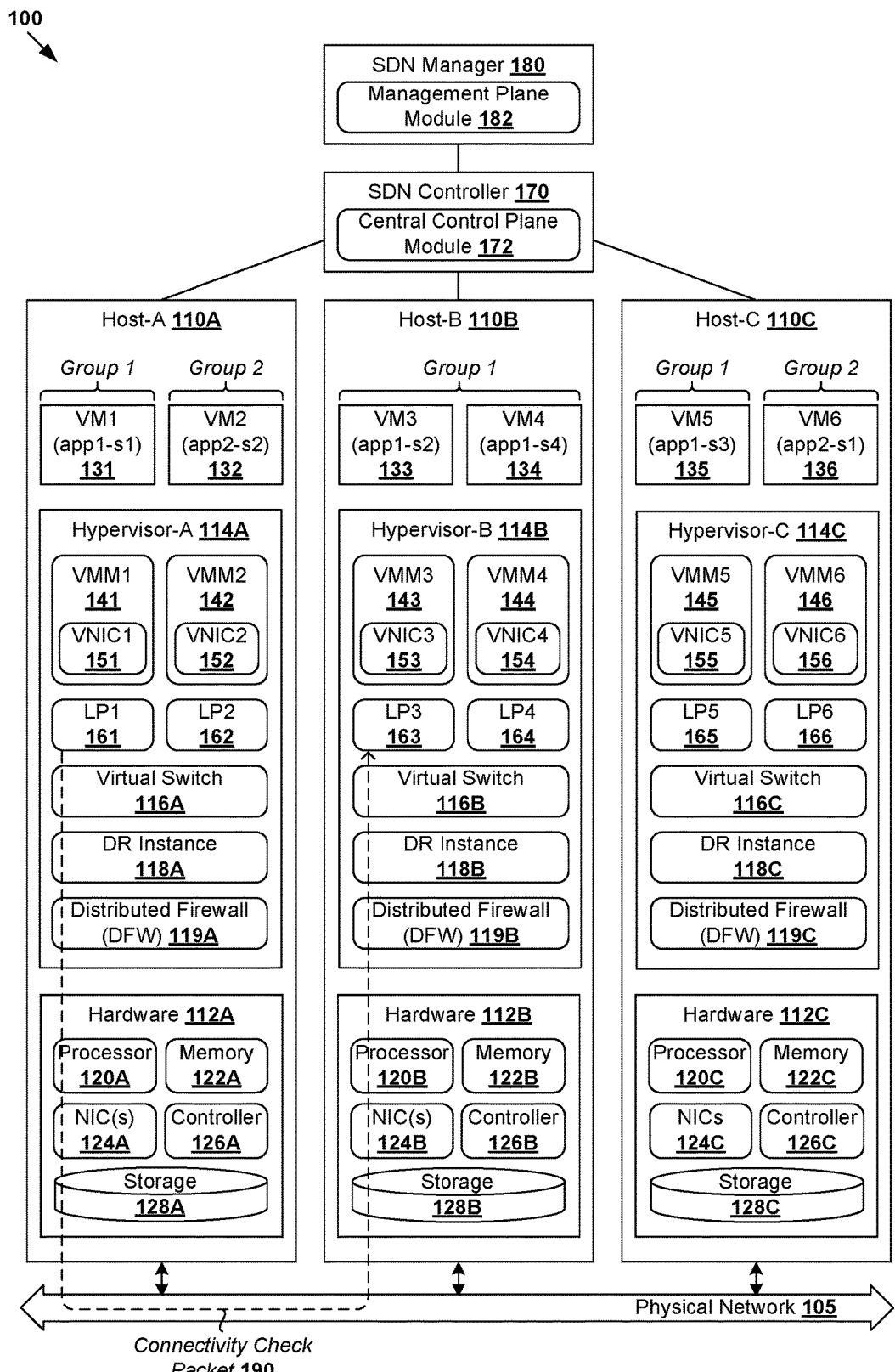
FIG. 1 is a schematic diagram illustrating an example virtualized computing environment in which a connectivity check may be performed for a multi-node application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to connectivity checks will now be explained in more detail using FIG. 1, which is a schematic diagram illustrating example virtualized computing environment 100 in which connectivity checks may be performed for a multi-node application. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are interconnected via physical network 105. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "host computers", "host devices", "physical servers", "server systems", "transport nodes," etc.), where each host may be supporting tens or hundreds of virtual machines.

Figure 7:
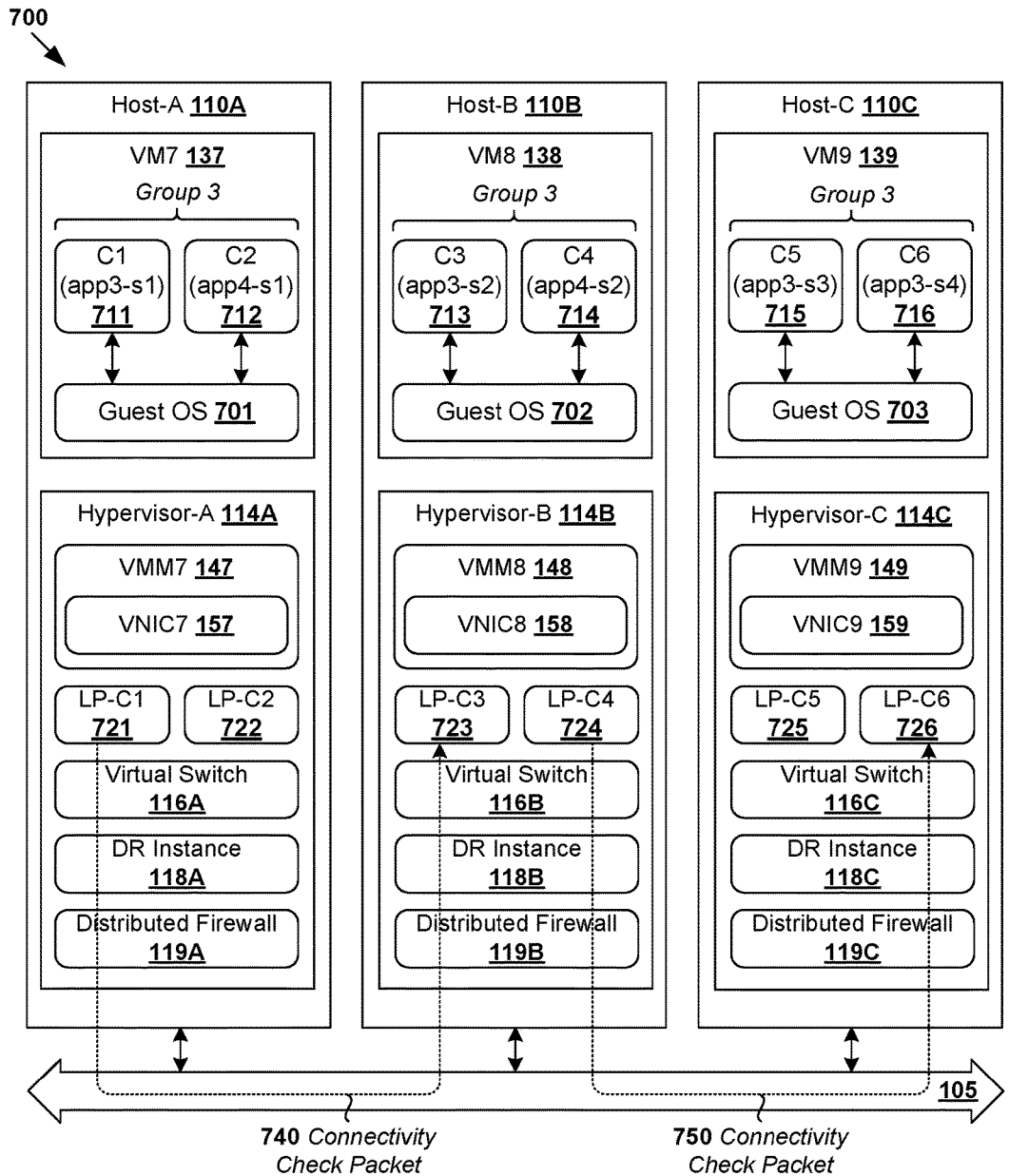
FIG. 7 is a schematic diagram illustrating example connectivity checks for a group of containers in a virtualized computing environment.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. Example containers will be discussed further using FIG. 7. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B/114C maintains a mapping between underlying hardware 112A/112B/112C and virtual resources allocated to respective virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. Corresponding to hardware 112A/112B/112C, the virtual resources may include virtual CPU, virtual memory, virtual disk, virtual network interface controller (VNIC), etc. Hardware resources may be emulated using virtual machine monitors (VMMs) 141-146, which may be considered as part of corresponding virtual machines 131-136, or alternatively, separated from virtual machines 131-136. In the example in FIG. 1, VNICs 151-

156 are emulated by corresponding VMMs 141-146. Although one-to-one relationships are shown, one virtual machine may be associated with multiple VNICs (each VNIC having its own network address).

Through software defined networking (SDN), benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. Hypervisor 114A/114B/114C further implements virtual switch 116A/116B/116C and logical distributed router (DR) instance 118A/118B/118C to handle egress packets from, and ingress packets to, corresponding virtual machines 131-136 located on logical overlay network(s). In practice, logical forwarding elements such as logical switches and logical distributed routers may be implemented in a distributed manner and can span multiple hosts to connect virtual machines 131-136. For example, logical switches that provide logical layer-2 connectivity may be implemented collectively by virtual switches 116A-C and represented internally using forwarding tables (not shown) at respective virtual switches 116A-C. Further, logical distributed routers that provide logical layer-3 connectivity may be implemented collectively by DR instances 118A-C and represented internally using routing tables (not shown) at respective DR instances 118A-C.

Virtual switch 116A/116B/116C also maintains forwarding information to forward packets to and from corresponding virtual machines 131-136. Packets are received from, or sent to, each virtual machine via an associated logical port. For example, logical ports LP1 161, LP2 162, LP3 163, LP4 164, LP5 165 and LP6 166 are associated with respective VM1 131, VM2 132, VM3 133, VM4 134, VM5 135 and VM6 136. As used herein, the term "logical port" may refer generally to a port on a logical switch to which a virtualized computing instance is connected. A "logical switch" may refer generally to an SDN construct that is collectively implemented by virtual switches 116A-C in the example in FIG. 1, whereas a "virtual switch" may refer generally to a software switch or software implementation of a physical switch. In practice, there is usually a 1:1 mapping between a logical port on a logical switch and a virtual port on virtual switch 116A/116B/116C. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

SDN manager 180 and SDN controller 170 are network management entities that facilitate implementation of software-defined (e.g., logical overlay) networks in virtualized computing environment 100. One example of an SDN controller is the NSX controller component of VMware NSX® (available from VMware, Inc.) that operates on a central control plane. SDN controller 170 may be a member of a controller cluster (not shown) that is configurable using SDN manager 180 operating on a management plane. Network management entity 170/180 may be implemented using physical machine(s), virtual machine(s), or both. Logical switches, logical routers, and logical overlay networks may be configured using SDN manager 180, SDN controller 170, etc.

SDN controller 170 is also responsible for collecting and disseminating control information relating to logical overlay networks and overlay transport tunnels, such as logical network topology, membership information of logical overlay networks, mobility of the members, protocol-to-hardware address mapping information of the members, VTEP information, firewall rules and policies, etc. To send and receive the control information, each host 110A/110B/110C may implement a local control plane (LCP) agent (not shown) to interact with central control plane module 172 on SDN controller 170. For example, a control-plane channel may be established between SDN controller 170 and host 110A/110B/110C using Transmission Control Protocol (TCP) over Secure Sockets Layer (SSL), etc.

To facilitate communication among members of a logical overlay network, hypervisor 114A/114B/114C implements a virtual tunnel endpoint (VTEP) to encapsulate egress packets from a source with an outer (tunnel) header identifying the logical overlay network. The VTEP also performs decapsulation before virtual switch 116A/116B/116C forwards (decapsulated) packets to a destination. In the example in FIG. 1, VTEP-A may be implemented by hypervisor-A 114A, VTEP-B by hypervisor-B 114B, and VTEP-C by hypervisor-C 114C (the VTEPs are not shown for simplicity). A logical overlay network may be formed using any suitable protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts.

To protect virtual machines on each host 110A/110B/110C against security threats caused by unwanted packets, hypervisor 114A/114B/114C implements distributed firewall engine 119A/119B/119C to filter packets to and from associated virtual machines. For example, at host-A 110A, hypervisor 114A implements distributed firewall engine 119A to filter packets for VM1 131 and VM2 132. SDN controller 170 may be used to configure distributed firewall engine 119A/119B/119C to implement firewall rules. Network packets may be filtered according to firewall rules at any point along a datapath from virtual machines 131-136 to the physical NIC 124A-C. In one embodiment, a filter component (not shown) may be incorporated into each VNIC 151-156 that enforces firewall rules that are associated with the endpoint corresponding to that VNIC and maintained by firewall engine 119A-119C. The term "packet" may refer generally to a group of bits that can be transported together from a source to a destination, such as message, segment, datagram, etc. The term "layer-2" may refer generally to a Media Access Control (MAC) layer; "layer-3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

In the example in FIG. 1, virtual machines 131-136 may be deployed as network nodes to implement various multi-node applications whose functionality is distributed over the network nodes. In particular, VM1 131, VM3 133, VM4 134 and VM5 135 may implement a first multi-node application ("app1"), while VM2 132 and VMM6 136 may implement a second multi-node application ("app2"). Each "network node" may implement any suitable functionality, such as to operate as a web server, database server, application server, etc. Depending on the desired implementation, multiple network nodes may implement the same functionality to improve performance and fault tolerance, in which case a load balancer (not shown) may be deployed to distribute traffic among those network nodes using any suitable algorithm (e.g., round robin, least connection, chained failover, source IP address hash, etc.).

Referring to the first multi-node application as an example, data-plane connectivity is required among VM1 131, VM3 133, VM4 134 and VM5 135 to implement various functionalities. For example, VM1 131 (e.g., web server) supported by host-A 110A may require connectivity with VM3 133 (e.g., database server) supported by host-B 110B to query or manipulate data stored in a database. To facilitate communication between VM1 131 and VM3 133 (e.g., located on the same logical overlay network), host-A 110A and host-B 110B may communicate via a data-plane channel over physical network 105, which may include any suitable interconnected network devices such as physical routers, physical switches, etc. However, in practice, the connectivity between VM1 131 and VM3 133 may be lost or degrade over time due to reasons such as configuration changes, hardware and/or software failures, etc. To address this issue, a connectivity check may be performed to determine whether VM1 131 has connectivity with VM3 133.

Conventionally, one approach requires a user (e.g., network administrator) to (manually) debug networking problems using a trace tool when a particular service of a multi-node application is down. Such conventional approach is generally inefficient and time consuming because, inter alia, it is a non-trivial task for the user to keep track of the different virtual machines implementing various functionalities of a multi-node application, identify which virtual machine requires connectivity with which virtual machine, identify logical ports associated with the virtual machines to perform tracing, and determine whose connectivity has been affected. This problem is exacerbated as the number of virtual machines implementing the multi-node application increases.

Connectivity Checks

Figure 2:
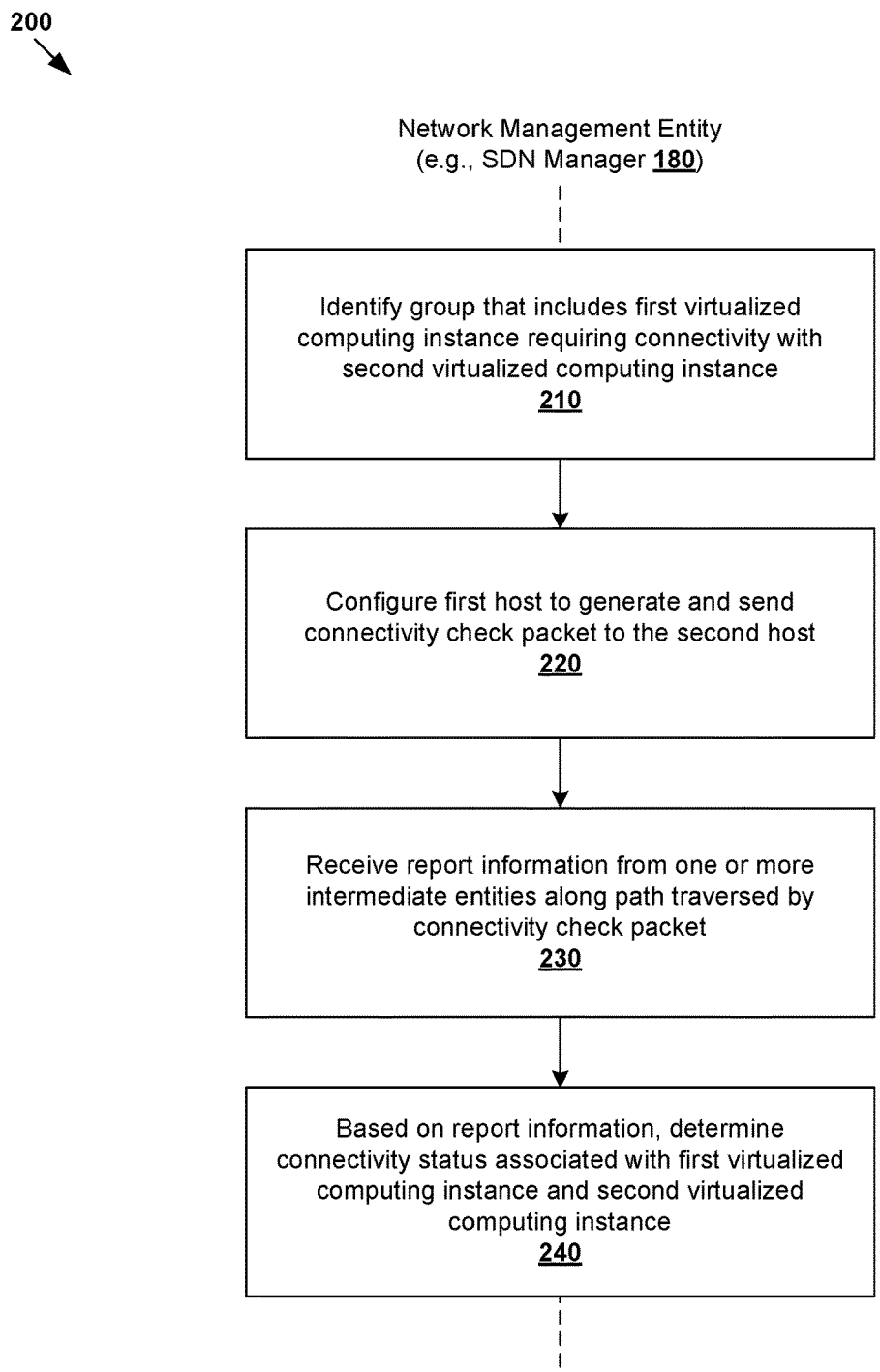
FIG. 2 is a flowchart of an example process to perform a connectivity check in a virtualized computing environment.

According to examples of the present disclosure, connectivity checks may be implemented in an improved manner by automatically identifying a group of multiple virtual machines that implements a multi-node application and configuring connectivity checks among them. In more detail, FIG. 2 is a flowchart of example process 200 for a network management entity to perform a connectivity check in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation.

Throughout the present disclosure, various examples will be explained using host-A 110A as an example "first host"; host-B 110B as "second host"; VM1 131 as "first virtualized computing instance," VM3 133 as "second virtualized computing instance." In practice, example process 200 may be implemented by any suitable "network management entity," such as SDN manager 180 using connectivity check module 182. SDN manager 180 using connectivity check module 182. Depending on the desired implementation, example process 200 may be implemented by SDN controller 170, etc.

At 210 in FIG. 2, a group of multiple virtualized computing instances (e.g., virtual machines, containers, etc.) is identified. The group may implement a particular multi-node application, or multiple multi-node applications that require inter-application communication. Each multi-node application may be implemented by multiple nodes (e.g., virtualized computing instances) that are configured to perform the same set of functionalities or services, or different sets of functionalities or services. In this case, the group identified at block 210 may include members that implement the same set of functionalities or services, or members that implement different sets of functionalities or services, or a combination thereof.

For example in FIG. 1, SDN manager 180 may identify a group implementing a multi-node application (e.g., "app1"). The group may include VM1 131 supported by host-A 110A that requires connectivity with VM3 133 supported by host-B 110B. For example, in a multi-tier architecture, multiple instances that perform the same functionality may be deployed on each tier, and inter-tier connectivity is generally required. In this case, VM1 131 may represent a node on one tier (e.g., web tier) that requires connectivity with VM3 133 on another tier (e.g., database tier). In another example, in a microservice architecture, members of the group may be instances implementing the same microservice (i.e., same functionality), or different microservices. In this case, VM1 131 may represent a first node implementing a first microservice, and VM3 133 a second node implementing a second microservice. In a further example, in a cloud environment, a tenant application may have multiple instances and access some common services (e.g., database, load balancer, exchange server, etc.) provided by the cloud of deployed by the same tenant. As will be described further using FIG. 3 and FIG. 4, any suitable information may be used to identify the group, such as application information, traffic flow information, firewall rule information, or any combination thereof.

At 220 in FIG. 2, host-A 110A is configured to generate and send a connectivity check packet to host-B 110B (see 190 in FIG. 1). For example, the connectivity check packet may include an inner header that is addressed from VM1 131 to VM3 133, and an outer header that is addressed from host-A 110A to host-B 110B. As will be described further using FIG. 3 and FIG. 5, a connectivity check session may be configured between LP1 161 associated with VM1 131 and LP3 163 associated with VM3 133. Alternatively, the connectivity check session may be configured between VNIC1 151 associated with VM1 131 and VNIC3 153 associated with VM3 133.

At 230 in FIG. 2, based on report information is received from one or more entities along a path traversed by the connectivity check packet, a connectivity status associated with VM1 131 and VM3 133 may be determined. For example, connectivity status=connected based on report information indicating that VM1 131 has connectivity with VM3 133. In another example, connectivity status=disconnected based on report information indicating that VM1 131 has lost connectivity with VM3 133.

As will be described further using FIG. 3 and FIG. 6, each "entity" represents an observation point along a path between VM1 131 and VM3 133. An entity may be a physical entity, such as a host, physical switch, physical router, etc. Alternatively, an entity may be a logical entity, such as a logical port, VNIC, distributed firewall, logical switch, logical router, etc. A combination of physical and logical entities may be used as observation points. Various example will be described below.

Group Identification

Figure 3:
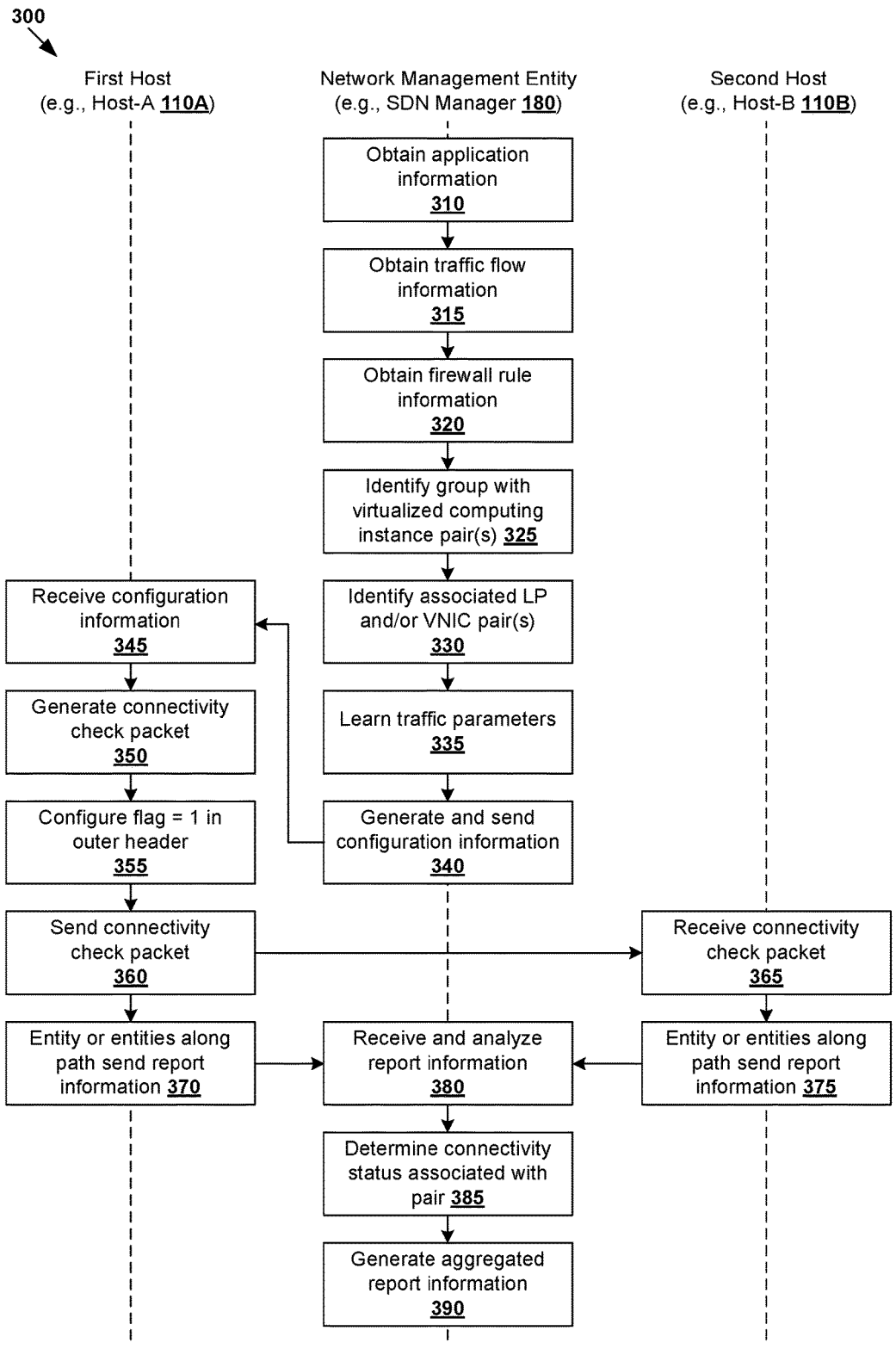
FIG. 3 is a flowchart of an example detailed process for performing a connectivity check in a virtualized computing environment.

FIG. 3 is a flowchart of example detailed process 300 for a network management entity to perform a connectivity check in virtualized computing environment 100. Example process 300 may include one or more operations, functions, or actions illustrated by one or more blocks, such as 310 to 390. The various blocks may be combined into fewer blocks, divided into additional blocks, and/or eliminated depending on the desired implementation. Depending on the desired implementation, example process 300 may be implemented by SDN manager 180 using connectivity check module 182, and host 110A/110B/110C using hypervisor 114A/114B/114C. Example process 300 will be explained using FIG. 4, which is a schematic diagram illustrating example group identifications 400 in virtualized computing environment 100.

At 310, 315, 320 and 325 in FIG. 3, a group of virtual machine(s) implementing a multi-node application may be identified in virtualized computing environment 100. For example in FIG. 4, two groups are identified. A first group implementing a first multi-node application ("app1") includes VM1 131, VM3 133, VM4 134 and VM5 135. A second group implementing a second multi-node application ("app2") includes VM2 132 and VM6 136.

Each group may be identified based on any suitable information, such as application information, traffic flow information, firewall rule information, or any combination thereof, etc. For example, application information specifying any suitable attribute(s) of a particular multi-node application may be obtained at block 310 from a user (e.g., network administrator) via any suitable interface provided by SDN manager 180, such as application programming interface (API), graphical user interface (GUI), command line interface (CLI), etc. Traffic flow information may be obtained at block 315 from any suitable monitoring tool, such as NetFlow Logic (a trademark of NetFlow Logic Corporation), etc. Firewall rule information may be obtained at block 320 from distributed firewall engine 119A/119B/119C and/or SDN controller 170.

In practice, application information suitable for application discovery may also be obtained from any other source(s), such as an agent installed on a guest OS of a virtual machine, compute stack, plugin, cloud computing tool, etc. For example, the agent running inside a virtual machine may be configured to obtain or discover the application information, such as name, information relating to how micro services are distributed among multiple virtual machines or containers, APIs (e.g., REST APIs) exposed by the virtual machine or container, etc. Further, the application information may be obtained from Infrastructure-as-a-Service (IaaS) solutions such as VMware vSphere®, Red Hat OpenStack®, Amazon Web Services® (AWS), etc. In another example, the application information may be obtained from Platform-as-a-Service (PaaS) solutions or container cluster for discovering applications and microservices (to be discussed further using FIG. 7), such as Cloud Foundry® from The Cloud Foundry Foundation®, Kubernetes® from The Linux Foundation®, Red Hat OpenShift®, Apache Mesos®, etc.

Figure 4:
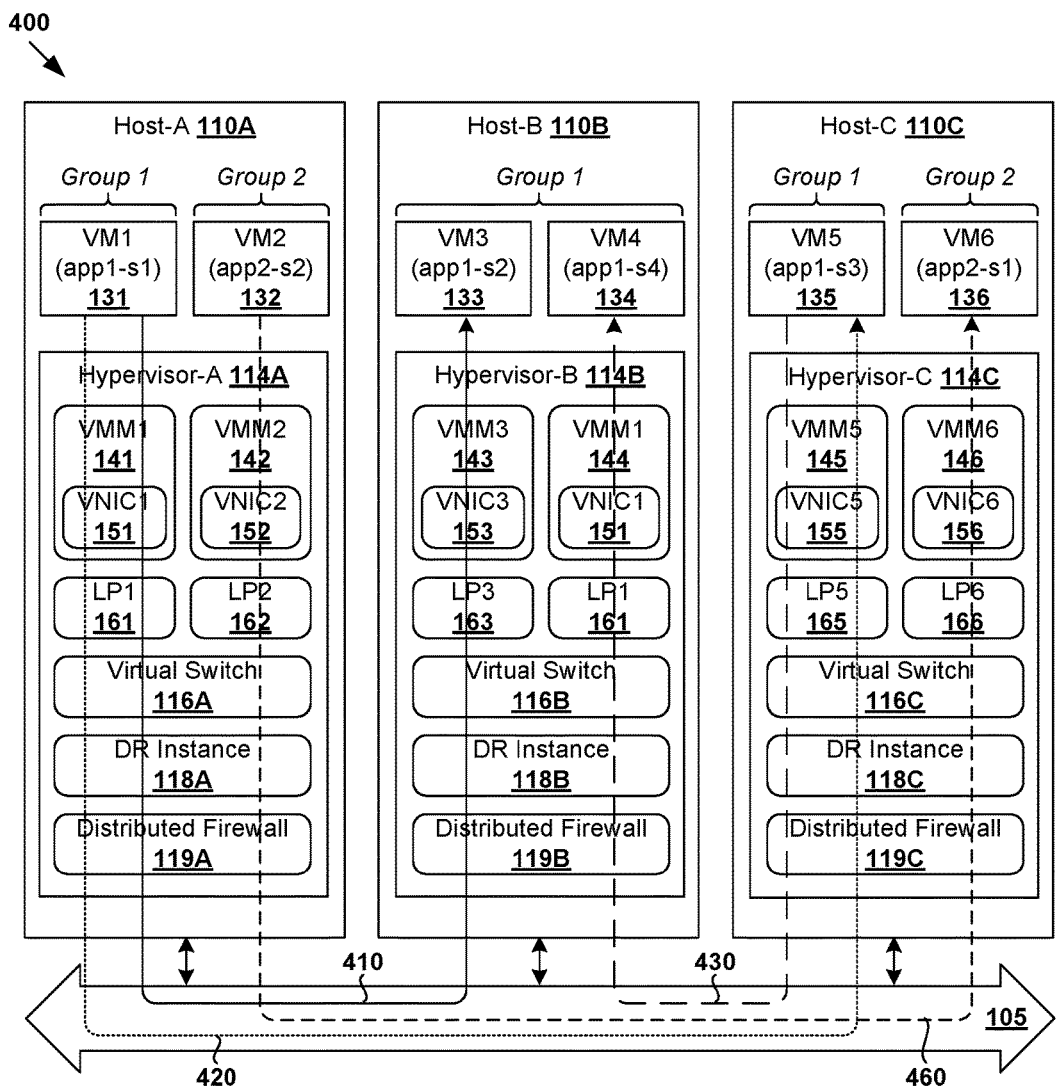
FIG. 4 is a schematic diagram illustrating a schematic diagram illustrating example group identifications in a virtualized computing environment.

In the example in FIG. 4, SDN manager 180 may obtain application information that specifies name="app1-s1" associated with VM1 131, "app1-s2" associated with VM3 133, "app1-s3" associated with VM5 135 and "app1-s4" associated with VM4 134. Based on the application information, first group=(VM1, VM3, VM4, VM5) may be identified. Further, SDN manager 180 may obtain traffic flow information to identify the first group and/or determine whether connectivity is required between a pair of virtual machines. For example, the traffic flow information may identify a first traffic flow between source IP address=IP-1 associated with VM1 131 and destination IP address=IP-3 associated with VM3 133 (see 410), which indicates that VM1 131 requires connectivity with VM3 133. Similarly, the traffic information may identify a second traffic flow between IP-1 and IP-5 associated with VM5 135 (see 420) and a third traffic flow between IP-5 and IP-4 associated with VM4 134 (see 430). It is therefore determined that VM1 131 requires connectivity with VM5 135, and VM5 135 requires connectivity with VM4 134.

Alternatively or additionally, SDN manager 180 may obtain firewall rule information (see 440) to identify the first group and/or determine whether connectivity is required between a pair of virtual machines. For example, firewall rules 442-444 may be implemented by distributed firewall engine 119A at source host-A 110A to allow traffic flows between VM1 131 and VM3 133, as well as between VM1 131 and VM5 135. Firewall rule 446 may be implemented by distributed firewall engine 119C at source host-C 110C to allow traffic flows between VM5 135 and VM4 134. Alternatively or additionally, the firewall rules may be invoked at the respective destination hosts.

Each firewall rule may each be defined using five tuples: source network address, source port number (PN), destination network address, destination PN, and protocol, in addition to an action (e.g., allow or deny). An acceptable value, or range of values, may be specified for each tuple. The protocol tuple (also known as service) may be set to transmission control protocol (TCP), user datagram protocol (UDP), Hypertext Transfer Protocol Secure (HTTPS), Internet Control Message Protocol (ICMP), etc.

In practice, to facilitate group identification, a user may also select a particular application or virtual machine as an initial member of a group (e.g., VM1 131 in the first group). Based on the initial member as well as the traffic flow information and firewall rule information, additional members that communicate with the initial member, or among themselves, may be identified (e.g., VM3 133, VM4 134 and VM5 135). A group is then formed with the initial member along with the additional members.

At 330 in FIG. 3, each pair of virtual machines requiring connectivity may be mapped to a corresponding pair of logical ports and/or VNICs. As shown at 450 in FIG. 4, first virtual machine pair (VM1, VM3) may be mapped to (LP1, LP3) and (VNIC1, VNIC3), where "LP1," "LP3," "VNIC1" and "VNIC3" are IDs of respective LP1 161, LP3 163, VNIC1 151 and VNIC3 153 shown in FIG. 1. Similarly, at 452 in FIG. 4, second virtual machine pair (VM1, VM5) may be mapped to (LP1, LP5) and (VNIC1, VNIC5). Further, at 454 in FIG. 4, third virtual machine pair (VM5, VM4) may be mapped to (LP5, LP4) and (VNIC5, VNIC4). As will be discussed further using FIG. 5, the mappings may be used to inject connectivity check packets at logical ports or VNICs.

Further, second group=(VM2, VM6) may be identified according to blocks 310-325 in FIG. 3, such as based on application information (e.g., "app2-s1" and "app2-s2"), traffic flow information identifying a traffic flow (see 460) from source IP address=IP-2 associated with VM2 132 to destination IP address=IP-6 associated with VM6 136, and firewall rule information (see 448) that allows the communication between VM2 132 and VM6 136, etc. Further, according to block 330, (VM2, VM6) may be mapped to (LP2, LP6) and (VNIC2, VNIC6); see corresponding 456 in FIG. 4.

At 335 in FIG. 3, traffic parameters associated with each pair of virtual machines may also be learned, such as traffic type (e.g., unicast, broadcast, multicast, etc.), protocol (e.g., TCP, UDP, ICMP, etc.), frame size, etc. In relation to the first group identified in FIG. 4, VM1 131 and VM3 133 communicates using protocol=TCP, VM1 131 and VM5 135 using HTTPS, and VM5 135 and VM4 134 using UDP. In relation to the second group, VM2 132 and VM6 136 communicates using protocol=TCP. Each pair of VMs communicates in a unicast manner, but broadcast or multicast communication may also be used in practice.

Connectivity Check Packets

At 340 in FIG. 3, a first host is configured to generate and send a connectivity check packet to a second host. For example, SDN manager 180 may generate and send host 110A/110B/110C configuration information associated with the connectivity check packet, such as source and destination information (e.g., VM name, VNIC ID, logical port ID, IP address, MAC address), traffic type (e.g., unicast, broadcast, multicast, etc.), protocol (e.g., TCP, UDP, ICMP, etc.), time-to-live (TTL), TCP or UDP source and destination port numbers, ICMP ID and sequence number, an expiry timeout (e.g., 10,000 milliseconds), frame size (e.g., 1000 bytes), payload encoding, payload value, etc. The configuration information may be generated based on the traffic parameters learned at block 335.

Relating to (VM1, VM3) in the example in FIG. 4, SDN manager 180 may send configuration information to host-A 110A to configure a first connectivity check session between source LP1 161 and destination LP3 163. Relating to (VM1, VM5), further configuration information may be sent to host-A 110A to configure a second connectivity check session between source LP1 161 and destination LP5 165. Further, relating to (VM5, VM4), SDN manager 180 may send configuration information to host-C 110C to configure a third connectivity check session between source LP5 165 and destination LP4 164. A unique session ID may be assigned to each connectivity check session. Depending on the desired implementation, a connectivity check session may be configured between a pair of VNICs, such as between VNIC1 151 and VNIC3 153 associated with respective VM1 131 and VM3 133.

At 345 to 365 in FIG. 3, the first host may generate, encapsulate and send a connectivity check packet to a second host based on the configuration information received from SDN manager 180. In practice, any suitable approach may be used to generate the connectivity check packet. For example, tools such as Traceflow (available from VMware, Inc.) may be used to inject a packet into a logical port and collect reports from various observation points along a path traversed by the packet. The "observation points" may include physical and/or logical entities, such as host, logical switches, logical routers, etc. Some examples will be discussed using FIG. 5 and FIG. 6 below.

FIG. 5 is a schematic diagram illustrating example connectivity check packet configurations 500 in virtualized computing environment 100. In the example in FIG. 5, first group=(VM1, VM3, VM4, VM5) is interconnected via logical switches 501-502 and logical router 503. Logical switches LS1 501 and LS2 502 are configured to provide logical layer-2 switching services to the virtual machines. Logical ports LP1 161 and LP3 163 represent ports on LS1 501, whereas LP4 164 and LP5 165 represent ports on LS2 502. Logical router DR 503 is a distributed router (DR) that is configured to provide logical layer-3 routing services to the virtual machines. DR 503 is implemented in a distributed manner in that it may span multiple hosts, including host-A 110A that supports VM1 131, host-B 110B supporting VM3 133 and VM4 134, and host-C 110C supporting VM5 135.

In practice, another example of a logical router is a service router (SR) that provides centralized stateful services to the virtual machine(s), such as firewall protection, load balancing, etc. DR and SR are also known as distributed and centralized routing components, respectively. In a multi-tenant environment, a multi-tier topology may be used to provide isolation for multiple tenants. For example, a two-tier topology includes an upper tier (i.e., tier-0) associated with a provider logical router (PLR) and a lower tier (i.e., tier-1) associated with a tenant logical router (TLR). In this case, a logical router may be categorized as one of the following types: TLR-DR, PLR-DR, TLR-SR and PLR-SR (e.g., to connect to an external network).

(a) First Example: VM1 131 and VM3 133

A first connectivity check may be performed by configuring host-A 110A to inject a first connectivity check packet (see 510 in FIG. 5) at LP1 161. First connectivity check packet 510 includes inner header 514 and payload 512 that are encapsulated with outer header 516 according to blocks 350 and 355 in FIG. 3. Inner header 514 is addressed from (IP-1, MAC-1) associated with VM1 131 to (IP-3, MAC-3) associated with VM3 133. Payload 512 may include any suitable data, such as a connectivity check session ID (e.g., traceflow session ID=ID1), ICMP data (where applicable), etc.

Outer header 516 specifies source address information (VTEP IP=IP-A, MAC=MAC-A) associated with a source VTEP-A implemented by hypervisor-A 114A, destination address information (VTEP IP=IP-C, MAC=MAC-C) associated with a destination VTEP-B implemented by hypervisor-B 114B and a logical overlay network ID (e.g., VNI=5001) on which VM1 131 and VM3 133 are located. Outer header 516 further includes connectivity check flag 518 that indicates that the packet is a connectivity check packet. Depending on the desired implementation, outer header 516 may include any additional header and/or data labels (e.g., GENEVE header and data labels). VM1 131 and VM3 133 are connected via LS1 501 (spanning both host-A 110A and host-B 110B).

(b) Second Example: VM1 131 and VM5 135

A second connectivity check may be performed by configuring host-A 110A to inject a second connectivity check packet (see 520 in FIG. 5) at LP1 161. Similarly, second connectivity check packet 520 includes inner header 524 and payload 522 that are encapsulated with outer header 526. Inner header 524 is addressed from (IP-1, MAC-1) to (IP-5, MAC-5) associated with VM5 135. Outer header 526 specifies (VTEP IP=IP-A, MAC=MAC-A) associated with a source VTEP-A implemented by hypervisor-A 114A and (VTEP IP=IP-C, MAC=MAC-C) associated with a destination VTEP-C implemented by hypervisor-C 114C. Outer header 526 may also specify VNI=5001, connectivity check flag=1 (see 528), etc. VM1 131 and VM5 135 are connected via LS1 501, DR 503 and LS2 502 (each spanning both host-A 110A and host-C 110C).

(c) Third Example: VM5 135 and VM4 134

A third connectivity check for VM5 135 and VM4 134 may be performed by configuring host-C 110C to inject a third connectivity check packet (see 530 in FIG. 5) at LP5 165. Similarly, third connectivity check packet 530 includes inner header 534 and payload 532 that are encapsulated with outer header 536. Inner header 534 is addressed from (IP-5, MAC-5) associated with VM5 135 to (IP-4, MAC-4) associated with VM4 134. Outer header 536 is addressed from (VTEP IP=IP-C, MAC=MAC-C) associated with a source VTEP-C implemented by hypervisor-C 114C and (VTEP IP=IP-B, MAC=MAC-B) associated with a destination VTEP-B implemented by hypervisor-B 114B. Outer header 536 may also specify VNI=5001, connectivity check flag=1 (see 538), etc. VM5 135 and VM4 134 are connected via LS2 502 (spanning both host-C 110C and host-B 110B).

Report Information

At 370, 375, 380 in FIG. 3, SDN manager 180 receives report information from various entities (i.e., observation points) along a path traversed by a connectivity check packet. For example, based on connectivity check flag=1 in the connectivity check packet, a logical or physical entity along the path will generate and send a report message to SDN manager 180. As explained using FIG. 2, each reporting "entity" may be a physical entity (e.g., host) or a logical entity (e.g., logical port, distributed firewall, logical switch, logical router, etc.).

Some examples are shown in FIG. 6, which is a schematic diagram illustrating example report information associated with the connectivity check packets in the example in FIG. 5. The report information generated and sent by a logical or physical entity may identify a particular connectivity session and an observation type, such "injected" to indicate an injection of a connectivity check packet, "received" to indicate that receipt by an entity, "forwarded" to indicate forwarding by the entity, and "delivered" to indicate that the destination has been reached.

(a) First Example: VM1 131 and VM3 133

First connectivity check packet 510 in FIG. 5 traverses along a path on which LP1 161, distributed firewall 119A, LS1 501, distributed firewall 119B and LP3 163 are located. In this case, SDN manager 180 may receive report information (see 610 in FIG. 6) from LP1 161 when first connectivity check packet 510 is injected (see 611); distributed firewall engine 119A at host-A 110A when first connectivity check packet 510 is received and forwarded (see 612 and 613) and LS1 501 instantiated on host-A 110A when first connectivity check packet 510 is forwarded (see 614). Further, when first connectivity check packet 510 reaches host-B 110B, SDN manager 180 receives report information from LS1 501 instantiated on host-B 110B (see 615), distributed firewall engine 119B (see 616 and 617) and hypervisor-B 114B when first connectivity check packet 510 reaches destination LP3 163 (see 618). The report information generated and sent by distributed firewall 119A/119B may identify a firewall rule invoked.

(B) Second Example: VM1 131 and VM5 135

Ideally, second connectivity check packet 520 in FIG. 5 should have traversed a path on which LP1 161, distributed firewall 119A, LS1 501, DR 503 distributed firewall 119B and LP5 165 are located. In the example in FIG. 6, SDN manager 180 receives second report information (see 620) from hypervisor-A 114A when second connectivity check packet 510 is injected at source LP1 161 (see 621), distributed firewall engine 119A when second connectivity check packet 510 is received and forwarded (see 622 and 623) and LS1 501 instantiated on host-A 110A when second connectivity check packet 510 is forwarded (see 624). However, at DR 503, second connectivity check packet 510 is dropped (see 625).

(a) Third Example: VM5 135 and VM4 134

Third connectivity check packet 530 in FIG. 5 traverses along a path on which LP5 165, distributed firewall 119C, LS2 502, distributed firewall 119B and LP3 163 are located. In this case, SDN manager 180 may receive report information (see 630 in FIG. 6) from LP5 165 when third connectivity check packet 530 is injected (see 631); distributed firewall engine 119C at host-C 110C when third connectivity check packet 530 is received and forwarded (see 632 and 633) and LS2 502 instantiated on host-C 110C when third connectivity check packet 530 is forwarded (see 634). Further, when third connectivity check packet 530 reaches host-B 110B, report information is received from LS2 502 instantiated on host-B 110B (see 635), distributed firewall engine 119B (see 636 and 637) and hypervisor-B 114B when third connectivity check packet 530 reaches destination LP3 163 (see 638).

Analysis and Aggregation

At 385 in FIG. 3, SDN manager 180 analyzes report information 610/620/630 to determine whether there is connectivity between each pair of virtual machines implementing a multi-node application. For example, based on first report information 610, it is determined that there is connectivity between VM1 131 and VM3 133 and corresponding LP1 161 and LP3 163 (see connectivity status="connected" at 641 in FIG. 6). Similarly, based on third report information 630, it is determined that there is connectivity between VM5 135 and VM4 134 and corresponding LP5 165 and LP4 164 (see connectivity status="connected" at 643 in FIG. 6).

In contrast, based on second report information 620, it is determined that there is no connectivity between VM1 131 and VM5 135. In other words, LP1 161 and LP5 165 are associated with connectivity status=disconnected (see 642 in FIG. 6). In this case, SDN manager 180 may automatically generate and send an alert to inform a user (e.g., network administrator) that there is no connectivity between VM1 131 and VM5 135. The alert may also identify where second connectivity check packet 520 is injected (e.g., LP1 161), forwarded (e.g., distributed firewall 119A and LS1 501) and subsequently dropped (e.g., DR 503).

Further, SDN manager 180 generates aggregated report information (see 640 in FIG. 6) associated with the multi-node application based on report information 610-630. In particular, aggregated report information 640 provides a user with a clearer picture of which virtual machines have been grouped, and the connectivity status among them. As shown in the examples, it is not necessary for a particular virtual machine to require connectivity with every other virtual machine in the group.

In the above examples, it should be noted that it is not necessary to deliver first connectivity check packet 510 to VM3 133, second connectivity check packet 520 to VM5 135 and third connectivity check packet 530 to VM4 134. Additionally or alternatively, connectivity check packets may be generated and sent from host-B 110B to host-A 110A for (VM3, VM1), from host-C 110C to host-A 110A for (VM5, VM1) and from host-B 110B to host-C 110C for (VM4, VM5), respectively.

Although explained using first group=(VM1, VM3, VM4, VM5), example process 300 may also be performed to identify second group=(VM2, VM6) implementing a second multi-node application. The identification may be performed according to blocks 310 to 325 based on any suitable information, such as application information identifying "app2-s1" associated with VM2 132 and "app2-s2" associated with VM6 136, traffic flow information identifying a traffic flow between VM2 132 and VM6 136, firewall rule information identifying a firewall rule invocable at host-A 110A or host-C 110C to allow the traffic flow between VM2 132 and VM6 136, any combination thereof, etc.

Next, according to blocks 330-340 in FIG. 3, SDN manager 180 may identify LP2 162 and VNIC2 152 associated with VM2 132, as well as LP6 166 and VNIC6 156 associated with VM6 136 such that a connectivity check session may be configured between them. Further, based on report information associated with a connectivity check packet from host-A 110A to host-C 110C, SDN manager 180 may determine whether there is connectivity between VM2 132 and VM6 136 according to blocks 380-390. As new members are added to the group, additional connectivity check sessions may be automatically configured. Depending on the desired implementation, the connectivity status associated with a virtual machine pair may indicate connectivity performance information performance information (e.g., round trip time, packet loss, delay, etc.), instead of connected or disconnected. For example, Traceflow reports generally include other information such as timestamp, based on which the round trip time may be calculated.

Although explained using virtual machines 131-136, it should be understood that the "group of multiple virtualized computing instances" identified according to block 210 in FIG. 2 and blocks 310-340 in FIG. 3 may include other data compute nodes such as containers, a combination of virtual machines and containers, etc. In this case, connectivity checks may be performed to determine whether there is connectivity between a pair of containers, between a virtual machine and a container, etc. Some examples will be described using FIG. 7, which is a schematic diagram illustrating connectivity checks with a group of containers in virtualized computing environment 700. In the example in FIG. 7, container technologies may be used to run various containers inside virtual machines 137-139, which are associated with respective VMMs 147-149 and VNICs 157-159.

As used herein, the term "container" (also known as "container instance") is used generally to describe an application that is encapsulated with all its dependencies (e.g., binaries, libraries, etc.). For example, containers C1 711 and C2 712 may be executed as isolated processes on guest OS 701 inside VM7 137. Similarly, C3 713 and C4 714 may be executed as isolated processes on guest OS 702 of VM8 138, and C5 715 and C6 716 on guest OS 703 of VM9 139. Containers 711-716 are "OS-less", meaning that they do not include any OS that could weigh 10s of Gigabytes (GB). This makes containers 711-716 more lightweight, portable, efficient and suitable for delivery into an isolated OS environment. Running containers inside a virtual machine (known as "containers-on-virtual-machine" approach) not only leverages the benefits of container technologies but also that of virtualization technologies. Containers 711-716 are associated with respective logical ports labelled LP-C1 721, LP-C2 722, LP-C3 723, LP-C4 724, LP-C5 725 and LP-C6 726. Logical ports 721-726 are configured to connect containers 711-716 to logical switches (not shown) that are collectively implemented using virtual switches 116A-C and represented internally using forwarding tables at respective virtual switches 116A-C.

According to the examples of the present disclosure, a group that includes containers 711-716 may be identified according to example process 300 in FIG. 3 based on any suitable application information, traffic flow information, firewall rule information, etc. In the example in FIG. 7, containers 711-716 may represent independent nodes of microservice applications labelled "app3" and "app4." Depending on the desired implementation, a microservice may be implemented by one container or multiple containers. Each container may be configured to interact with at least one other container to implement the microservice. In practice, the microservice architecture may be implemented to continuous delivery or deployment of large, complex applications. Connectivity may be required among containers implementing a particular microservice application (i.e., intra-application connectivity) and/or among those implementing different microservice applications (i.e., inter-application connectivity).

Similar to the examples in FIG. 3 and FIG. 4, once a pair of containers requiring connectivity is identified, its corresponding pair of logical ports and/or VNICs may be identified for connectivity check purposes. For example in FIG. 7, five container pairs may be identified. In particular, at 730, a first container pair=(C1, C3) is associated with address information (IP-C1, IP-C3) and application information (app3-s1, app3-s2), logical port pair=(LP-C1, LP-C3) and VNIC pair=(VNIC7, VNIC8). Similarly, at 732, a second container pair=(C3, C5) is associated with (IP-C3, IP-05), (app3-s2, app3-s3), (LP-C3, LP-05) and (VNIC8, VNIC9). At 734, a third container pair=(C3, C6) is associated with (IP-C3, IP-C6), (app3-s2, app3-s4), (LP-C3, LP-C6) and (VNIC8, VNIC9). At 736, a fourth container pair=(C2, C4) is associated with (IP-C2, IP-C4), (app4-s1, app4-s2), (LP-C2, LP-C4) and (VNIC7, VNIC8). At 738, a fifth container pair=(C4, C6) is associated with (IP-C4, IP-C6), (app4-s2, app3-s4), (LP-C4, LP-C6) and (VNIC8, VNIC9).

To perform a connectivity check for container pair (C1, C3), a network management entity (e.g., SDN manager 180) may configure host-A 110A to generate and send first connectivity check packet 740 to host-B 110B, such as by injecting the packet at LP-C1 721 or VNIC7 157 associated with C1 711. In another example, to perform a connectivity check for container pair (C4, C6), host-B 110B may be configured to generate and send second connectivity check packet 750 to host-C 110C, such as by injecting the packet at LP-C4 724 or VNIC8 158 associated with C4 714. Connectivity check packet 740/750 may be configured based on traffic parameters associated with the corresponding container pair, such as traffic type, protocol, etc.

Similar to the examples in FIG. 3 and FIG. 5, connectivity check packet 740/750 may include an inner header addressed from one container to another (e.g., from IP-C1 to IP-C3), an outer header addressed from one host to another (e.g., from IP-A of host-A 110A to IP-B of host-B 110B), logical overlay network information (e.g., VNI=5001) and connectivity check packet flag=1. The connectivity checks may be performed in a manner that is transparent to the relevant containers 711-716 and virtual machines 147-149. Similar to the examples in FIG. 6, a network management entity (e.g., SDN manager 180) may receive report information from physical and/or logical entities along a path traversed by connectivity check packet 740/750, such as logical port, VNIC, distributed firewall, logical switch, logical router, etc. Based on the report information, a connectivity status associated with the corresponding container pair may be determined. Similar connectivity checks may also be performed for other container pairs, such as (C3, C6), (C3, C5) and (C2, C4) in FIG. 7.

According to the examples of the present disclosure, a group of virtual machines, containers or other types of virtualized computing instances implementing one or more multi-node applications may be automatically identified or discovered. The automatic identification in turn facilitates the automatic detection and reporting of connectivity problems associated with the group. Compared to conventional approaches that require significant manual effort by the user to identify the group and detect such problems, the examples of the present disclosure may be implemented to reduce downtime and improve performance.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system may be deployed in virtualized computing environment 100 to perform the functionality of a network management entity (e.g., SDN manager 180), host 110A/110B/110C, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to perform a connectivity check in a virtualized computing environment that includes the network management entity, a first host and a second host, wherein the method comprises:
    identifying, by the network management entity, a group of multiple virtualized computing instances that are deployed as network nodes of a multi-node application, wherein the group includes a first virtualized computing instance supported by the first host that requires data-plane connectivity with a second virtualized computing instance supported by the second host, and the first virtualized computing instance is configured to implement a first service of the multi-node application, and the second virtualized computing instance is configured to implement a second service of the multi-node application;
    configuring, by the network management entity, the first host to generate and send a connectivity check packet to the second host based on the identified group of multiple virtualized computing instances; and
    based on report information from one or more entities along a path traversed by the connectivity check packet, determining, by the network management entity, a connectivity status associated with the first virtualized computing instance and the second virtualized computing instance.

2. The method of claim 1, wherein identifying the group comprises:
    identifying a first logical port or a first virtual network interface controller (VNIC) associated with the first virtualized computing instance; and
    identifying a second logical port or a second VNIC associated with the second virtualized computing instance.

3. The method of claim 2, wherein configuring the first host further comprises:
    configuring a connectivity check session between the first logical port and the second logical port or between the first VNIC and the second VNIC.

4. The method of claim 1, wherein the method further comprises:
    receiving the report information from one or more of the following entities: a first distributed firewall implemented by the first host, a first distributed firewall implemented by the second host, a logical switch connecting the first virtualized computing instance with the second virtualized computing instance and a logical router connecting the first virtualized computing instance with the second virtualized computing instance.

5. The method of claim 1, wherein identifying the group comprises one or more of the following:
    obtaining application information specifying one or more attributes associated with each of the multiple virtualized computing instances;
    obtaining traffic flow information to determine that the first virtualized computing instance requires connectivity with the second virtualized computing instance based on a traffic flow between them; and obtaining firewall rule information to determine that the first virtualized computing instance requires connectivity with the second virtualized computing instance based on a firewall rule that is invocable at the first host or the second host.

6. The method of claim 1, wherein configuring the first host comprises:
generating configuration information that specifies one or more parameters of the connectivity check packet; and
sending the configuration information to the first host to cause the first host to generate and send the connectivity check packet.

7. The method of claim 1, wherein configuring the first host comprises:
configuring the first host to generate the connectivity check packet to include an inner header that is addressed from the first virtualized computing instance to the second virtualized computing instance, an outer header that is addressed from the first host to the second host and a connectivity check packet flag.

8. A non-transitory computer-readable storage medium that includes a set of instructions which, in response to execution by a processor supporting a network management entity, cause the processor to perform a method of connectivity check in a virtualized computing environment that includes a first host and a second host:
identifying a group of multiple virtualized computing instances that are deployed as network nodes of a multi-node application, wherein the group includes a first virtualized computing instance supported by the first host that requires data-plane connectivity with a second virtualized computing instance supported by the second host, and the first virtualized computing instance is configured to implement a first service of the multi-node application, and the second virtualized computing instance is configured to implement a second service of the multi-node application;
configuring the first host to generate and send a connectivity check packet to the second host; and
based on report information from one or more entities along a path traversed by the connectivity check packet, determining a connectivity status associated with the first virtualized computing instance and the second virtualized computing instance.

9. The non-transitory computer-readable storage medium of claim 8, wherein identifying the group comprises:
identifying a first logical port or a first virtual network interface controller (VNIC) associated with the first virtualized computing instance; and
identifying a second logical port or a second VNIC associated with the second virtualized computing instance.

10. The non-transitory computer-readable storage medium of claim 9, wherein configuring the first host further comprises:
configuring a connectivity check session between the first logical port and the second logical port or between the first VNIC and the second VNIC.

11. The non-transitory computer-readable storage medium of claim 8, wherein the method further comprises:
receiving the report information from one or more of the following entities: a first distributed firewall implemented by the first host, a first distributed firewall implemented by the second host, a logical switch connecting the first virtualized computing instance with the second virtualized computing instance and a logical router connecting the first virtualized computing instance with the second virtualized computing instance.

12. The non-transitory computer-readable storage medium of claim 8, wherein identifying the group comprises one or more of the following:
obtaining application information specifying one or more attributes associated with each of the multiple virtualized computing instances;
obtaining traffic flow information to determine that the first virtualized computing instance requires connectivity with the second virtualized computing instance based on a traffic flow between them; and
obtaining firewall rule information to determine that the first virtualized computing instance requires connectivity with the second virtualized computing instance based on a firewall rule that is invocable at the first host or the second host.

13. The non-transitory computer-readable storage medium of claim 8, wherein configuring the first host comprises:
generating configuration information that specifies one or more parameters of the connectivity check packet; and
sending the configuration information to the first host to cause the first host to generate and send the connectivity check packet.

14. The non-transitory computer-readable storage medium of claim 8, wherein configuring the first host comprises:
configuring the first host to generate the connectivity check packet to include an inner header that is addressed from the first virtualized computing instance to the second virtualized computing instance, an outer header that is addressed from the first host to the second host and a connectivity check packet flag.

15. A network management entity to perform a connectivity check in a virtualized computing environment that includes a first host and a second host, comprising:
a processor; and
a non-transitory computer-readable medium having stored thereon instructions that, when executed by the processor, cause the processor to:
identify a group of multiple virtualized computing instances that are deployed as network nodes of a multi-node application, wherein the group includes a first virtualized computing instance supported by the first host that requires data-plane connectivity with a second virtualized computing instance supported by the second host, and the first virtualized computing instance is configured to implement a first service of the multi-node application, and the second virtualized computing instance is configured to implement a second service of the multi-node application;
configure the first host to generate and send a connectivity check packet to the second host; and
based on report information from one or more entities along a path traversed by the connectivity check packet, determine a connectivity status associated with the first virtualized computing instance and the second virtualized computing instance.

16. The network management entity of claim 15, wherein the instructions for identifying the group cause the processor to:
identify a first logical port or a first virtual network interface controller (VNIC) associated with the first virtualized computing instance; and identify a second logical port or a second VNIC associated with the second virtualized computing instance.

17. The network management entity of claim 16, wherein the instructions for configuring the first host further cause the processor to:
   configure a connectivity check session between the first logical port and the second logical port or between the first VNIC and the second VNIC.

18. The network management entity of claim 15, wherein the instructions further cause the processor to:
   receive the report information from one or more of the following entities: a first distributed firewall implemented by the first host, a first distributed firewall implemented by the second host, a logical switch connecting the first virtualized computing instance with the second virtualized computing instance and a logical router connecting the first virtualized computing instance with the second virtualized computing instance.

19. The network management entity of claim 15, wherein the instructions for identifying the group cause the processor to perform one or more of the following:
   obtain application information specifying one or more attributes associated with each of the multiple virtualized computing instances;
   obtain traffic flow information to determine that the first virtualized computing instance requires connectivity with the second virtualized computing instance based on a traffic flow between them; and
   obtain firewall rule information to determine that the first virtualized computing instance requires connectivity with the second virtualized computing instance based on a firewall rule that is invocable at the first host or the second host.

20. The network management entity of claim 15, wherein the instructions for configuring the first host cause the processor to:
   generate configuration information that specifies one or more parameters of the connectivity check packet; and
   send the configuration information to the first host to cause the first host to generate and send the connectivity check packet.

21. The network management entity of claim 15, wherein the instructions for configuring the first host cause the processor to:
   configure the first host to generate the connectivity check packet to include an inner header that is addressed from the first virtualized computing instance to the second virtualized computing instance, an outer header that is addressed from the first host to the second host and a connectivity check packet flag.

* * * * *